US008488673B2

(12) United States Patent
Dencher (10) Patent No.: US 8,488,673 B2
(45) Date of Patent: Jul. 16, 2013

(54) LATENCY RATE DISTORTION OPTIMISATION

(75) Inventor: Anthony Peter Dencher, Southampton (GB)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 899 days.

(21) Appl. No.: 12/555,955

(22) Filed: Sep. 9, 2009

(65) Prior Publication Data

US 2011/0058606 A1    Mar. 10, 2011

(51) Int. Cl.
*H04B 1/66* (2006.01)
*H04N 7/12* (2006.01)
*H04N 11/02* (2006.01)
*H04N 11/04* (2006.01)

(52) U.S. Cl.
USPC ............. 375/240.12; 375/240; 375/240.01; 375/240.02; 375/240.13; 375/240.14

(58) Field of Classification Search
USPC .............. 375/240, 240.01, 240.02, 240.12, 375/240.13, 240.14
See application file for complete search history.

(56) References Cited

U.S. PATENT DOCUMENTS
6,975,742 B2 * 12/2005 Cheng ........................ 382/243

OTHER PUBLICATIONS

Sullivan, "Rate DistortionOPtimization for Video Compression", IEEE, Nov. 1998, all pages.*
Gajula, "Optimizing Vaseline Profile in H.264 / AVC Video Coding by Parallel Programming and Fast Intra and Inter Predictions", The Texas University—Arlington, 2012, all pages.*
Wang, "A Novel Fast Algorithm for Intra Mode Decision in H.264 / AVC Encoders", IEEE 2006, all pages.*

* cited by examiner

*Primary Examiner* — Kwang B Yao
*Assistant Examiner* — Adam Duda (57) ABSTRACT

There is provided a method of improving latency in a Rate Distortion Optimization apparatus, comprising re-ordering processing of a sequence of 4×4 blocks of pixels received for processing by the Rate Distortion Optimization apparatus, the received order of the 4×4 blocks of pixels corresponding to the location of the 4×4 blocks of pixels within a macroblock, and processing the re-ordered sequence of 4×4 blocks in the Rate Distortion Optimization apparatus, where the re-ordering of the processing of the 4×4 blocks of pixels comprises interleaving the processing of two upper 4×4 blocks of pixels of a current 8×8 block with the processing of two lower 4×4 blocks of pixels of a previous 8×8 block. There is also provided a method of improving latency in a Rate Distortion Optimization apparatus, where the Rate Distortion Optimization apparatus assesses nine intra prediction modes and the method further comprises re-ordering processing of intra prediction modes such that a first six modes processed are not dependent on a block of pixels above and to the right of a current block of pixels, and processing the re-ordered sequence of intra prediction modes in the Rate Distortion Optimization apparatus.

5 Claims, 11 Drawing Sheets

| Clock Cycle | Prediction Mode 0 | Prediction Mode 1 | | Prediction Mode 7 | Prediction Mode 8 |
|---|---|---|---|---|---|
| 0 | Start 4x4Blk 0 | | | | |
| 1 | Prediction | | | | |
| 2 | Residual | Prediction | | | |
| 3 | Transform1 | Residual | | | |
| 4 | Transform2 | Transform1 | | | |
| 5 | Transform3 | Transform2 | ... | | |
| 6 | Transform4 | Transform3 | ... | | |
| 7 | Quantise1 | Transform4 | ... | | |
| 8 | Quantise2 | Quantise1 | ... | Prediction | |
| 9 | Quantise3 | Quantise2 | ... | Residual | Prediction |
| 10 | InvQuant1 | Quantise3 | ... | Transform1 | Residual |
| 11 | InvQuant2 | InvQuant1 | ... | Transform2 | Transform1 |
| 12 | InvTrans1 | InvQuant2 | ... | Transform3 | Transform2 |
| 13 | InvTrans2 | InvTrans1 | ... | Transform4 | Transform3 |
| 14 | InvTrans3 | InvTrans2 | ... | Quantise1 | Transform4 |
| 15 | InvTrans4 | InvTrans3 | ... | Quantise2 | Quantise1 |
| 16 | Recon | InvTrans4 | ... | Quantise3 | Quantise2 |
| 17 | Distortion1 | Recon | ... | InvQuant1 | Quantise3 |
| 18 | Distortion2 | Distortion1 | ... | InvQuant2 | InvQuant1 |
| 19 | Distortion3 | Distortion2 | ... | InvTrans1 | InvQuant2 |
| 20 | Distortion4 | Distortion3 | ... | InvTrans2 | InvTrans1 |
| 21 | Distortion5 | Distortion4 | ... | InvTrans3 | InvTrans2 |
| 22 | Luma RDO | Distortion5 | ... | InvTrans4 | InvTrans3 |
| 23 | | Luma RDO | ... | Recon | InvTrans4 |
| 24 | | | ... | Distortion1 | Recon |
| 25 | | | ... | Distortion2 | Distortion1 |
| 26 | | | | Distortion3 | Distortion2 |
| 27 | | | | Distortion4 | Distortion3 |
| 28 | | | | Distortion5 | Distortion4 |
| 29 | | | | Luma RDO | Distortion5 |
| 30 | | | | | Luma RDO |
| 31 | | | | | End 4x4blk 0 |
| 32 | Start 4x4Blk 1 | | | | |

| 4x4 Block Number | Cycles |
|---|---|
| 0 | 9 |
| Gap 0 | 22 |
| 1 | 9 |
| Gap 1 | 19 |
| 2 | 9 (+1) |
| 4 | 9 |
| Gap 2 | 12 |
| 3 | 9 (+1) |
| 5 | 9 |
| Gap 3 | 9 |
| 8 | 9 (+1) |
| 6 | 9 |
| Gap 4 | 19 |
| 9 | 9 (+1) |
| 7 | 9 |
| Gap 5 | 9 |
| 10 | 9 (+1) |
| 12 | 9 |
| Gap 6 | 12 |
| 11 | 9 (+1) |
| 13 | 9 |
| Gap 7 | 19 |
| 14 | 9 |
| Gap 8 | 22 |
| 15 | 9 |
| Gap 9 | 22 |
| Total | 315 |

LATENCY RATE DISTORTION OPTIMISATION

TECHNICAL FIELD

The invention is related to video coding in general, and in particular to method of improving latency in a Rate Distortion Optimisation apparatus.

BACKGROUND

Video compression methods are used within digital television broadcasting systems to reduce the data rate per channel while maintaining picture quality. It is a primary objective of these compression methods that the instantaneous demand of the moving television picture sequence for transmission capacity is substantially met at all times despite its varying complexity.

Typical transmission channels used to convey audio-visual material have fixed bit rates and so the varying demand of the picture sequence for capacity may not always be satisfied. It is an inevitable result of the compression process that for extremes of highly complex picture behaviour, the picture quality may occasionally be compromised in order that the bit rate criteria are met. By choosing a bit rate that is too low, poor quality will result for a significant proportion of the time. Conversely, a chosen bit rate that is too high will meet quality needs, but will waste transmission capacity for a significant proportion of the time. Thus, some kind of control mechanism is required that evens out the peaks and troughs of demand so that a given fixed bit rate is adequate to deliver good picture quality at all times. Part of such control ideally should take some objective measure of the picture quality into account so that the distortion in the picture is known to some degree. The optimisation of this process is called Rate Distortion Optimisation (RDO) and is an inherent part of practical realisations of modern compression methods.

The complex compression methods currently employed have become very sophisticated and use a variety of techniques in concert to achieve the objective of coding complex picture sequences using minimum bit rate. Typically, in such methods the compressed picture sequence of the television signal is hierarchically structured at a number of levels, each enabling the full set of coding tools available to be applied efficiently.

At the highest of these levels, the picture sequence is organised into contiguous Groups of Pictures (GOP) and each group is further organised so that the first picture of each GOP is coded without reference to any other picture in the sequence. This is known as Intra-picture coding, and the resultant picture is called an I picture. Subsequent pictures in the GOP are coded differentially with respect to other pictures in the GOP including this I picture.

For example the second picture in the GOP is typically predicted directly from the first I picture and the differences between the prediction and the actual picture, typically being small, are then coded with the consequence that the bit rate requirement is reduced. The resultant picture is known as a Predicted or P picture.

The next picture of the GOP may also be predicted in turn from this P picture and this pattern may repeat for the remainder of the GOP. These P predictions are uni-directional and use past pictures to predict future ones in a sequence of mutual dependence. It is also possible to code pictures in the GOP using Bi-directional prediction (i.e. using both past and future pictures) which effectively predictively interpolates the current picture. These pictures are known as B pictures.

Thus a typical GOP may have a structure such as IPPBPPB or IBBPBBP, etc, and this structure and the GOP length are arbitrary and set by the system operator to suit the needs of a given application.

In typical digital video systems, the two dimensional image of a scene that forms each picture in the moving sequence is resolved to a rectilinear array of picture elements, or pixels, each holding the value of the image intensity (luminance) and colour (chrominance) at a given point in the picture. This array is usually scanned in a raster fashion from top left to bottom right in a series of so-called horizontal lines, and then each scan is repeated regularly to produce a sequence. The resolution or sharpness of the picture is determined by the number of pixels allocated to the scan. The shape of the picture, its aspect ratio, determines the relationship between the number of horizontal and vertical pixels. In broadcast systems these numbers are standardised.

It is typical of television pictures that their representation takes one of two forms. Either the individual picture scans are completed using only one pass of the image or they can be done in two parts. The former scan type is called Progressive or Sequential scan, and the latter is called an Interlaced scan where half the scan is done in a first pass, where only the odd numbered horizontal lines are taken, and the second half is done a second pass where the remaining even numbered lines are taken. The first pass of the interlaced scan produces the so-called Top Field and the second pass the Bottom Field. The two fields together cover the same number of pixels as the complete Progressive scan, and the complete picture is called a Frame.

It is clear that any movement in the picture during the Interlace scan will result in a degree of dislocation between the pixels of each Field and that degree of dislocation will be more severe the greater the speed of motion. This dislocation can cause a significant loss of efficiency in the compression of moving pictures and so it is better to code rapidly moving picture sequences Field by Field. All currently used compression methods recognise this and allow both Field and Frame modes to be chosen as the picture behaviour demands.

The ITU-T H.264 (MPEG 4 part 10) compression standard used widely in the most recent commercial video compression products includes among its features the use of GOPs and a Field/Frame mode. In particular the coding of both P and B pictures in the GOP uses Inter-Field or Frame predictive methods. In order to extract the best performance from the standard, it divides each complete picture, either a Frame or a Field, into a large number of contiguous, rectilinear blocks of pixels. The most significant of these blocks is a square group of pixels called a macroblock (MB), which is typically 16×16 luminance pixels.

The encoding of each macroblock must be completed entirely within its duration period. This period depends on the television standard to which the image sequence conforms, since the television standard defines the number of macroblocks per picture, and the Frame/picture rate which defines the absolute time in which the processing needs to be completed. MPEG-4/H.264 in particular provides a significant number of options for coding each MB, each of which, in principle, requires evaluation before a final optimum choice is reached. The computing power and speed needed to do this are particularly challenging for high performance encoding equipment, and so an efficient practical method of achieving the required result is extremely valuable.

It is always possible to design a video encoder to fit given processing resources, but this may involve the incomplete implementation of some coding modes/options or even the complete absence of assessing some options. Such a design will be sub-optimal in performance, but may meet certain other criteria such as cost, power consumption and compactness. It may also be adequate for low or standard resolution applications (i.e. television formats with fewer than say 700 horizontal pixels) and where high picture quality is not the major requirement.

Nevertheless, it is always desirable provide a design that will contribute to improved performance within the prevailing constraints.

For example, in a high definition encoder working on a 1920×1080 pixel progressive picture format at a Frame rate of 60 Hz (the standard known as 1080p60), where a typical Frame period is 16.6 milliseconds, there are 120×68=8160 MBs in each Frame. Therefore, each MB is allocated 2 microseconds within which all the coding options need to be explored fully and a decision made on the best set of options to select for each individual MB (i.e. coding mode).

To achieve the most efficient and accurate video encoding, the comparison of the coding option candidates ideally takes into account how high the quality of the output image will be, and also how many bits will be taken to encode each candidate. The Rate-Distortion Optimization (RDO) technique solves this problem by taking into account both a video quality metric (by measuring the Distortion, which is the deviation of the coded from the source material), and the bit cost for each possible decision outcome.

Currently known methods of RDO candidate assessment are inefficient in their use of available processing resources, necessitating higher powered processing resources than is strictly required. Higher powered processing resources are more expensive to implement for a practical commercial hardware encoder, since they require attendant increases in running costs, such as power consumption and its contingent cooling requirement.

In the MPEG-4/H.264 standard, several coding modes are available, where predictions are made from sets of previously coded pixels, some in the same picture as the current MB (the Intra Mode), and others made by reference to neighbouring blocks in neighbouring reference pictures (the Inter Mode predictions).

In the Intra mode, each MB of 16×16 pixels may be subdivided into smaller blocks of pixels. One of these sub divisions is the 4×4 sub-block, of which there are 16 per MB, which are shown as 4×4 blocks 0 to 15 in FIGS. 1 and 2. Another common sub division is the 8×8 block (each of four 4×4 sub-partitions), shown as items A, B, C and D in FIG. 1.

Figure 1:
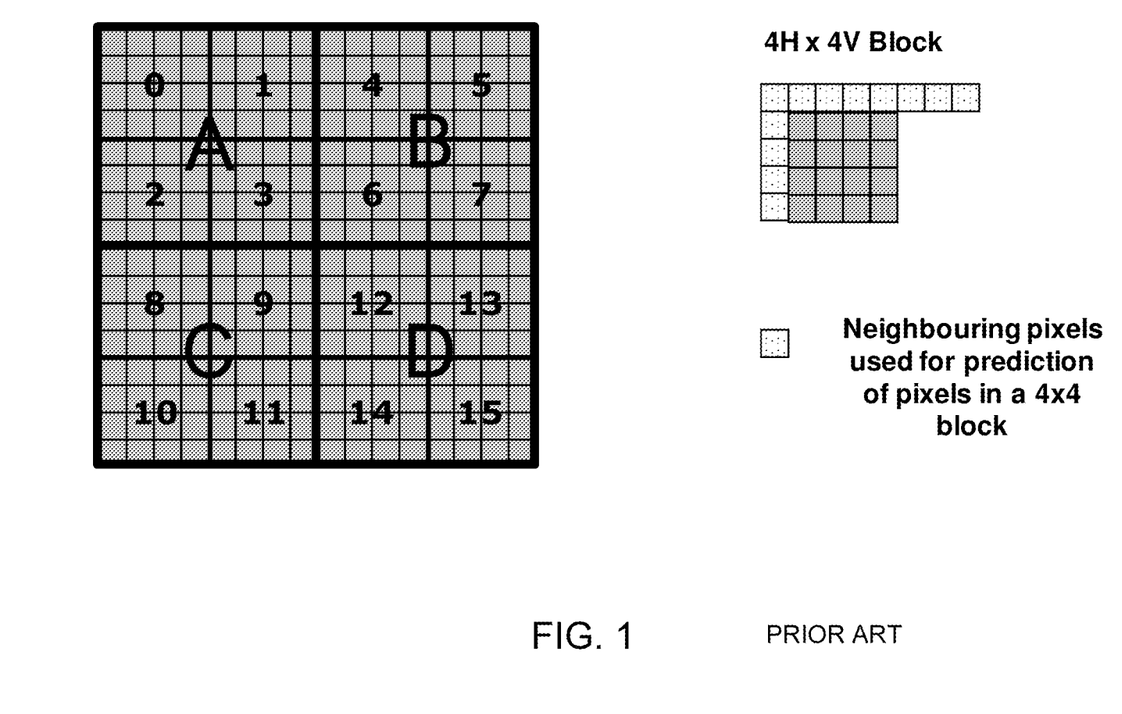
FIG. 1 shows how a macroblock of interest is separated into 8×8 blocks and 4×4 blocks, and which neighbouring 4×4 blocks are involved in the processing a 4×4 block of interest.

Also shown in FIG. 1 is the set of adjacent reference pixels used to predict each pixel of each 4×4 block. The predictions for the pixels of each one of the 4×4 blocks must be completed and evaluated before a choice is made for the coding of the parent MB based on the behaviour of all the possible MB partitions.

The assessment of the complete set of coding options demands that the processing resources makes available from a main memory, just at the right moment, all the relevant reference block pixel values as well as those of the current block. These pixel values include both luminance and chrominance values. The processing of the Intra 4×4 options is done within the same hardware resources as the other partitions of the MBs, but, if done in an inefficient manner, can consume an excessive proportion of those limited resources, thus constraining the performance of the overall coding process.

SUMMARY

Accordingly, the present invention seeks to provide an improved method and apparatus for assessing RDO candidates. In particular the invention deals with a specific implementation of one part of the RDO process that deals with realising the so called Infra 4×4 block option, where the prediction of each 4×4 block from selected neighbouring pixels within the same picture needs to be completed.

There is provided a method of improving latency in a Rate Distortion Optimisation apparatus. The method comprises re-ordering processing of a sequence of 4×4 blocks of pixels received for processing by the Rate Distortion Optimisation apparatus, where the received order of the 4×4 blocks of pixels corresponds to the location of the 4×4 blocks of pixels within a macroblock. The re-ordering of the processing of the 4×4 blocks of pixels comprises interleaving the processing of two upper 4×4 blocks of pixels of a current 8×8 block with the processing of two lower 4×4 blocks of pixels of a previous 8×8 block. The method further comprises processing the re-ordered sequence of 4×4 blocks in the Rate Distortion Optimisation apparatus By using re-ordering to reduce processing gaps between the processing of certain blocks of pixels whilst maintaining the required dependencies, the 4×4 intra candidate decision process pipeline is reduced in latency. Furthermore, by re-ordering the processing of intra prediction modes, a further reduction in latency is possible.

Accordingly, all the necessary candidates can be processed within the available macroblock processing time, even for 1080p60 Hz video.

Optionally, the step of interleaving the processing of the two upper 4×4 blocks of pixels of a current 8×8 block with the processing of the two lower 4×4 blocks of pixels of a previous 8×8 block comprises processing the first 4×4 block of pixels of either the two upper 4×4 blocks of pixels of a current 8×8 block or the two lower 4×4 blocks of pixels of a previous 8×8 block. Processing of the other remaining first block may then be carried out. The interleaving may then further comprise the processing of one of the second 4×4 block of pixels out of the two upper 4×4 blocks of pixels of a current 8×8 block or the two lower 4×4 blocks of pixels of a previous 8×8 block. Processing of the other remaining second block may then be carried out.

Figure 2:
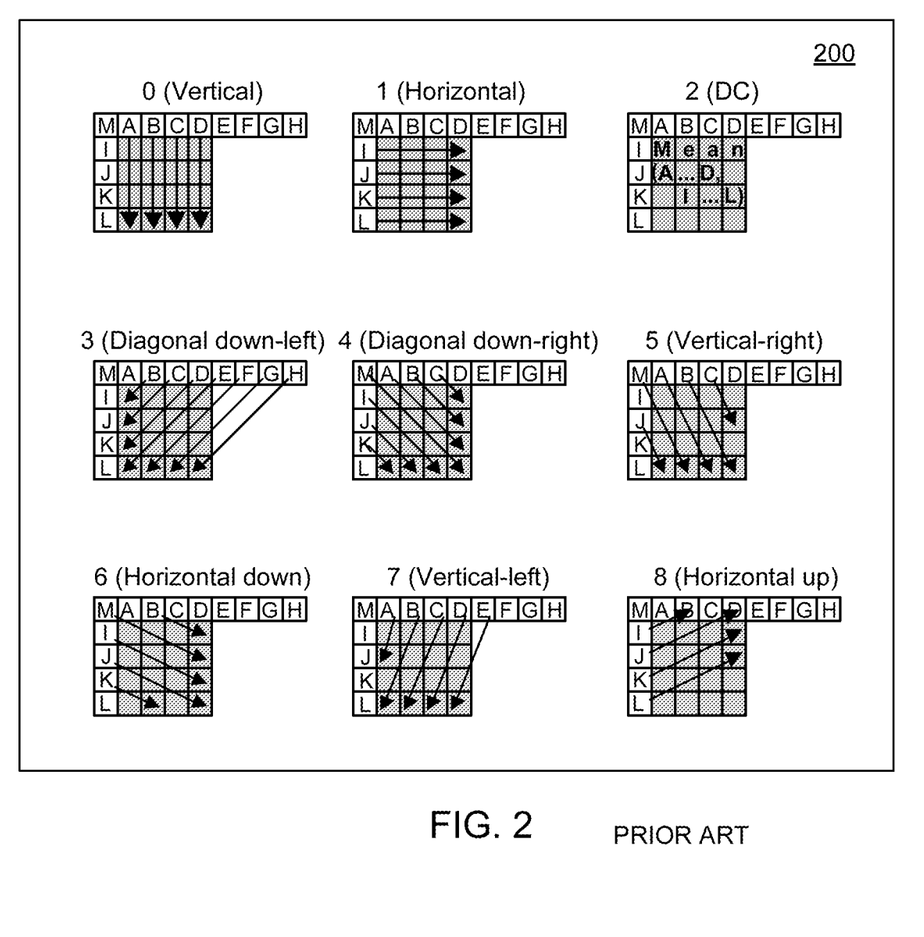
FIG. 2 shows the dependencies and block processing order for intra 4×4 modes in RDO.

Optionally, the 4×4 blocks of pixels of a macroblock of interest are numbered according to FIG. 2, and the method applies from blocks 3 to 13.

Optionally, the 4×4 blocks of pixels of a macroblock of interest are numbered according to FIG. 2, and the processing order is: 0, 1, 2 or 4*, 4 or 2*, 3 or 5*, 5 or 3*, 8 or 6*, 6 or 8*, 9 or 7*, 7 or 9*, 10 or 12*, 12 or 10*, 11 or 13*, 13 or 11*, 14, 15, where * indicates complimentary pairs of one each of the two alternative numbers in either order.

There is also provided a method of improving latency in a Rate Distortion Optimisation apparatus, where the Rate Distortion Optimisation apparatus assesses nine intra prediction modes (Mode 0 (Vertical), Mode 1 (Horizontal), Mode 2 (DC), Mode 3 (Diagonal Down Left), Mode 4 (Diagonal Down Right), Mode 5 (Vertical-Right), Mode 6 (Horizontal-Down), Mode 7 (Vertical-Left), and Mode 8 (Horizontal-Up)). The method further comprises re-ordering processing of intra prediction modes such that a first six modes processed are not dependent on a block of pixels above and to the right of a current block of pixels, and processing the re-ordered sequence of intra prediction modes in the Rate Distortion Optimisation apparatus.

Optionally, the step of re-ordering processing of intra prediction modes comprises reordering such that Modes 3, 7, 8 are processed last, in any order, and Modes 0, 1, 2, 4, 5 and 6 are processed in any order, except Mode 2 must not be the first mode processed.

Optionally, the step of re-ordering processing of intra prediction modes comprises processing the nine modes in the order: 0, 1, 2, 4, 5, 6, 3, 7, 8.

Both methods may be implemented together to provide greater latency improvements. For example, the re-ordering of the processing of blocks of pixels, and the re-ordering of the processing of intra prediction modes can be carried out individually or in combination. The combination of both re-ordering steps results in the lower latency overall.

In such a case, there is provided a method of improving latency in a Rate Distortion Optimisation apparatus, comprising re-ordering processing of a sequence of 4×4 blocks of pixels received for processing by the Rate Distortion Optimisation apparatus, the received order of the 4×4 blocks of pixels corresponding to the location of the 4×4 blocks of pixels within a macroblock. The re-ordering of the processing of the 4×4 blocks of pixels comprises interleaving the processing of two upper 4×4 blocks of pixels of a current 8×8 block with the processing of two lower 4×4 blocks of pixels of a previous 8×8 block. Where the Rate Distortion Optimisation apparatus assesses nine intra prediction modes (Mode 0 (Vertical); Mode 1 (Horizontal); Mode 2 (DC); Mode 3 (Diagonal Down Left); Mode 4 (Diagonal Down Right); Mode 5 (Vertical-Right); Mode 6 (Horizontal-Down); Mode 7 (Vertical-Left); Mode 8 (Horizontal-Up)) the method further comprises re-ordering processing of intra prediction modes such that a first six modes processed are not dependent on a block of pixels above and to the right of a current block of pixels, and processing the re-ordered sequence of intra prediction modes and the re-ordered sequence of 4×4 blocks in the Rate Distortion Optimisation apparatus.

There is also provided an RDO apparatus of a video encoder comprising a source input in communication with at least one RDO engine, said source input adapted to provide macroblock source data, and a best macroblock mode decision unit, where the at least one RDO engine comprises a 4×4 intra RDO engine adapted to carry out one or both of the described methods.

There is also provided a video encoder a source input data store and RDO apparatus adapted to carry out one or both of the described methods.

There is also provided a computer program product, comprising instructions, which when executed cause computer logic to carry out any of the described method. The RDO assessment process lends itself well to a pipelined approach, as it is a repeating sequence of events, but it does require very careful arrangement and data management.

There is also provided a method of improving latency in a Rate Distortion Optimisation apparatus, comprising one or more of the following steps. Re-ordering processing of blocks of pixels, such that non-dependent blocks of pixels are processed in a gap between the processing of two dependent blocks of pixels, or re-ordering processing of intra prediction modes into a processing order having a reduced number of cycles between an end of processing of one RDO prediction mode and the start of processing of another RDO prediction mode.

An Inter picture is a Predicted (P) or Bi-Predicted (B) picture, and an Infra picture is an I picture. A picture may be referred to as a slice.

Embodiments of the invention allows a pipelined RDO design to process all possible Intra 4×4 prediction mode options more efficiently which saves power, and in fewer overall clock cycles which allows other processing to utilize the resources in the spare cycles or allows a reduction in clock speed.

Embodiments of the present invention are particular advantageous in applications where high performance is required and all available coding options must be fully applied. This is because, with the ever present commercial demand for lower cost, greater compactness of implementation, lower power consumption and ability to support high definition television standards whose pixel densities per Frame lead to much higher processing speeds, the cost of including all options to their fullest extent is significant.

Existing decoding hardware may be used with the described improved RDO apparatus and method. Hence embodiments of the present invention are particularly beneficial when used to upgrade coding performance of digital video encoders that encode under older compression standards. This is because such an upgrade improves encoding performance without affecting the ability of existing decoders to decode the video data stream produced. Hence, quality of the overall system is improved without having to wholly replace the existing video decoding hardware at the receiver end. When dealing with an installed user base, this is an important consideration.

BRIEF DESCRIPTION OF THE DRAWINGS

A method and apparatus for Rate Distortion Optimisation will now be described, by way of example only, and with reference to the accompanying drawings in which.

DETAILED DESCRIPTION

An embodiment of the invention will now be described with reference to the accompanying drawings in which the same or similar parts or steps have been given the same or similar reference numerals.

The following description is cast in terms of an improvement to the H.264 video coding standard. However, it may equally be applied to any video encoding method having similar RDO decision constraints and quantisation method.

How an advantageous arrangement of pixel flow and computation order may be achieved is not revealed in the MPEG-4/H.264 specification, and so an encoder designer is left to choose how much or how little of the available options to implement. It is therefore not obvious how to ensure the best realization of the whole RDO process, including the Intra 4×4 options.

FIG. 2 shows the dependencies 200 and block processing order for intra 4×4 modes in Rate Distortion Optimisation. There are nine modes in total: Mode 0 (Vertical); Mode 1 (Horizontal); Mode 2 (DC transform coefficient/mean); Mode 3 (Diagonal Down Left); Mode 4 (Diagonal Down Right); Mode 5 (Vertical-Right); Mode 6 (Horizontal-Down); Mode 7 (Vertical-Left); and Mode 8 (Horizontal-Up). The reliance on values from other blocks of pixels, as shown in FIG. 2, is why the RDO process has certain constraints on the order in which modes can be assessed. However, by selecting a certain order of blocks of pixels and mode assessment, where every set of data is provided well in advance, or at least just in time, the overall processing time can be reduced to a minimum. There is no one optimal order, but several.

For a broadcast video encoder, a hardware design implemented using a Field Programmable Gate Array (FPGA) or Application Specific Integrated Circuit (ASIC) can be used to efficiently perform Rate Distortion Optimisation processing of all options (inter candidates and/or intra modes). A pipelined design, such as that shown in FIG. 3, can process the data within the macroblock period if the candidates or modes are processed contiguously such that the pipe is kept full. However, any time lost waiting for intermediate results of earlier stages represents wasted time and resource and may lead to the inability to perform RDO on all desirable candidates or modes within the available time limit.

Keeping the pipeline latency to a minimum improves the performance of the pipeline for processing any type of options (inter candidates, intra 16×16 mode candidates, intra 8×8 mode candidates, intra 4×4 modes, etc), but it is particularly important for intra 4×4 modes.

Processing all the Intra 4×4 modes within a macroblock period is challenging due to the dependency of a particular 4×4 block's prediction on the previously encoded 4×4 blocks, see FIG. 2. Processing of a particular 4×4 block can generally only start once the previous block has completed. Conventionally, a design would process the Intra 4×4 prediction modes in order (0 to 8) for a single 4×4 block, before moving on to the next 4×4 block. All sixteen 4×4 blocks would also be processed in order.

Figure 3:
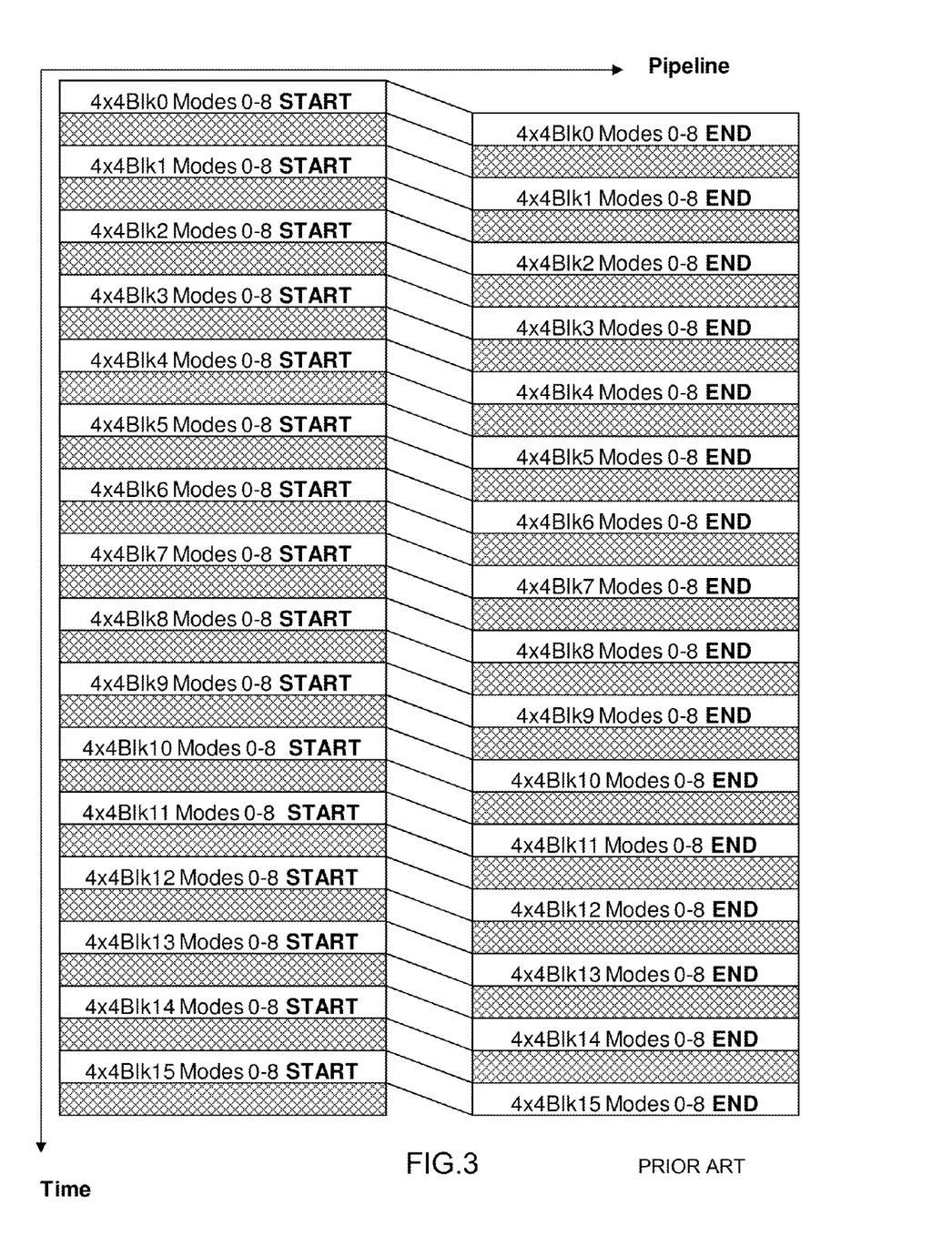
FIG. 3 shows a prior art method of processing 4×4 intra blocks, including pipeline delays.

This means that the 4×4 blocks cannot be processed contiguously, as shown in FIG. 3, making the pipeline inefficient and increasing the overall time required to process the Intra 4×4 options. However, the overall time must be less than the macroblock processing period.

As discussed above, for a 1080p60 encoder, the MB period is 2 µs. For a current generation FPGA a clock speed of 200 MHz is reasonable. This allows only 400 clock cycles per macroblock.

Figure 4:
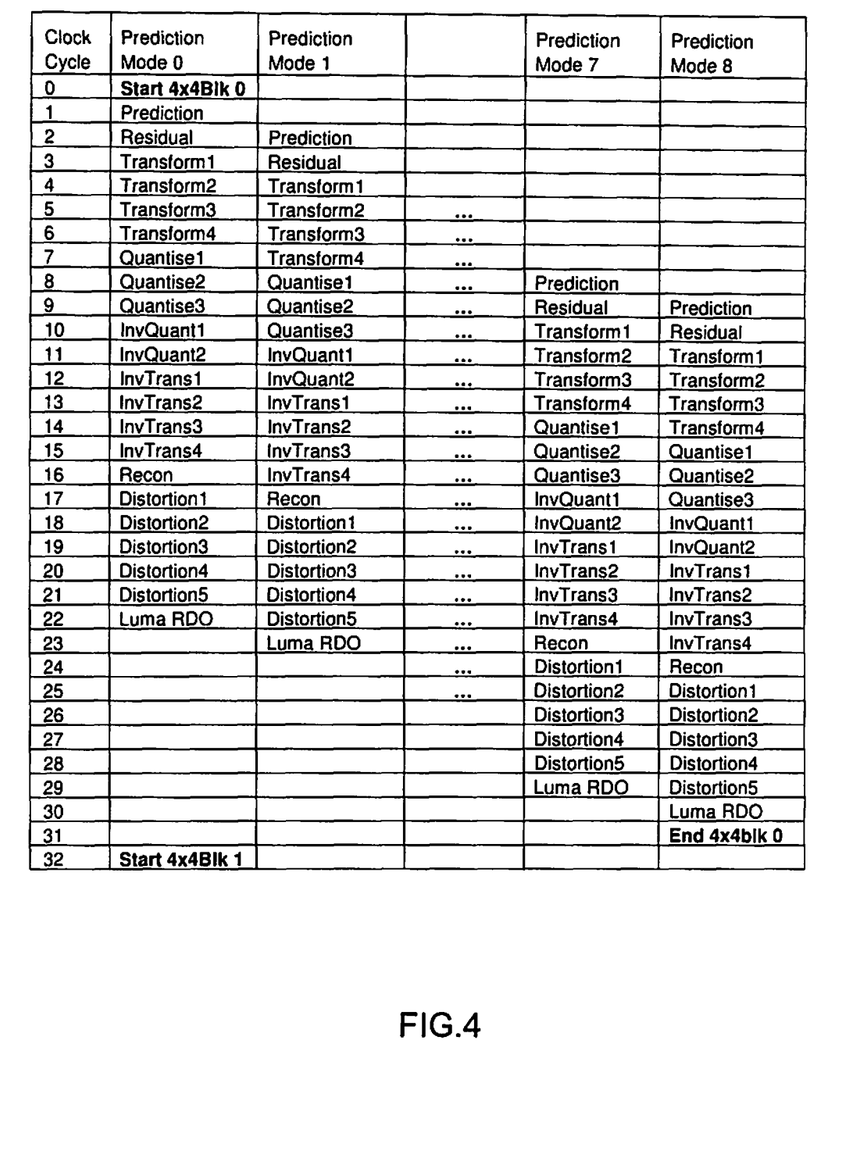
FIG. 4 shows a more detailed view of the processing cycles used by an RDO processing pipeline for 4×4 blocks adapted according to an embodiment of the present invention.

A 4×4 intra block processing pipeline is shown in FIG. 4. The pipeline latency is 22 clock cycles, with the overall time for processing all intra 4×4 options in a single RDO engine pipeline being $(22+9)*16=496$ cycles. This is greater than the 400 cycles available for processing a 1080p macroblock.

One possible solution is to reduce the number of prediction modes processed. For example, if the number of prediction modes was limited to four (instead of nine), then the number of cycles would be: $(22+4)*16=416$ cycles.

Even though this is processing less than half the number of modes as previously, it would still require a clock speed increase to fit it into the available macroblock period. In any case, reducing the number of modes used is very detrimental to encoder compression performance.

Figure 5:
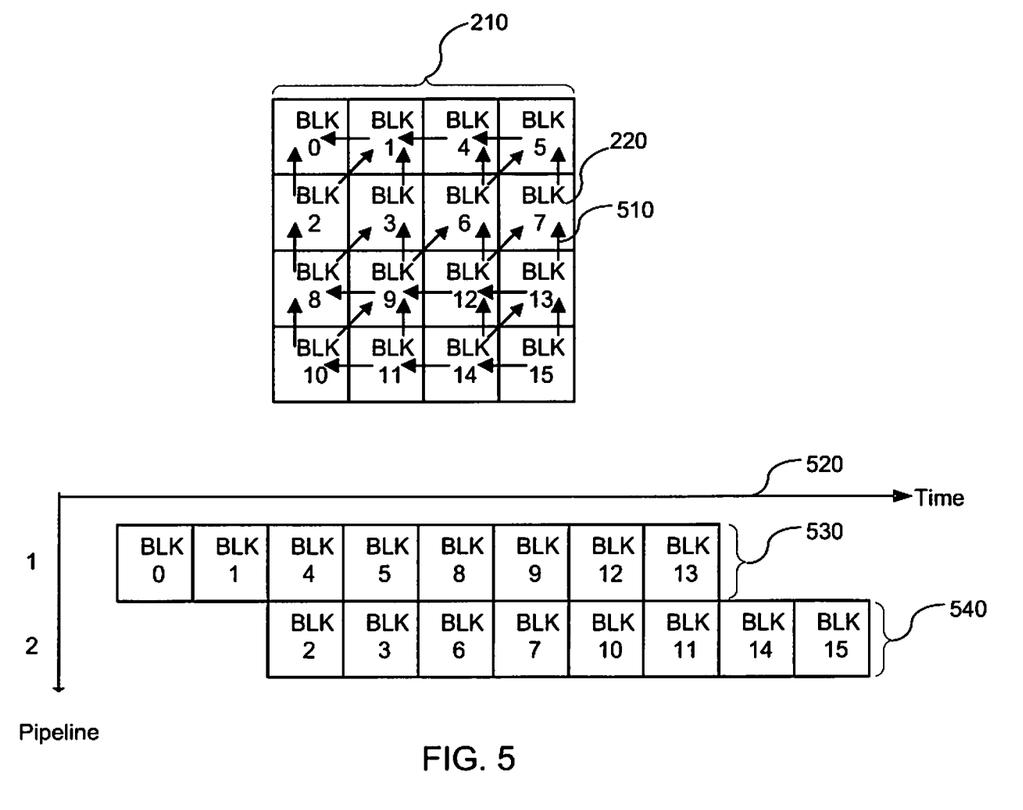
FIG. 5 shows how a dual RDO processing pipeline can be used to process 4×4 blocks.

Another solution is to use two Intra 4×4 RDO engine pipelines, which can be run in parallel to decrease the overall time required to process all the modes. Such a system is shown in FIG. 5, where a first pipeline 530 processes the upper 4×4 blocks of each 8×8 block, while the second pipeline processes the lower 4×4 blocks of each 8×8 block. If the second pipeline starts two 4×4 blocks after the first then all the prediction dependencies are satisfied and the overall time is reduced to: $(22+9)*10=310$ cycles.

FIG. 5 also shows the dependencies 510 for the processing of 4×4 blocks 220 within a macroblock 210. The arrows point in the direction of the dependency, e.g. arrow 510 shows block 13 is dependent on block 7 having been processed.

This is low enough to also allow cycles to be available for the final RDO decision and chosen macroblock generation, and all the possible modes are processed, which maximizes encoder performance. However, this solution requires twice as much resource in the FPGA or ASIC.

An embodiment of the present invention is an RDO implementation which reduces the overall time required to process all Infra 4×4 modes of a macroblock in a single pipelined RDO engine to be included in the design of an FPGA or ASIC video encoder. The reduced latency RDO Infra 4×4 block reduces the overall time required to process a macroblock to less than a 1080p60 Hz MB period (2 us), and avoids gaps between data, giving a more efficient design than existing implementations.

The overall time is reduced in two separately operable ways: firstly by re-ordering the processing of the 4×4 blocks within the macroblock so that gaps between their processing can be reduced such that as many as possible are processed contiguously (or almost contiguously) while the dependency of blocks on their neighbours is still satisfied.

Secondly, where the dependency of a particular 4×4 block on another 4×4 block is only for certain prediction modes, the gap between the processing is reduced such that the reconstructed data is available just in time for the processing of the first prediction mode which requires that data. Hence, the order of the processing of prediction modes is changed such that those modes that do not have a dependency on the previously processed 4×4 block are processed first.

Figure 7:
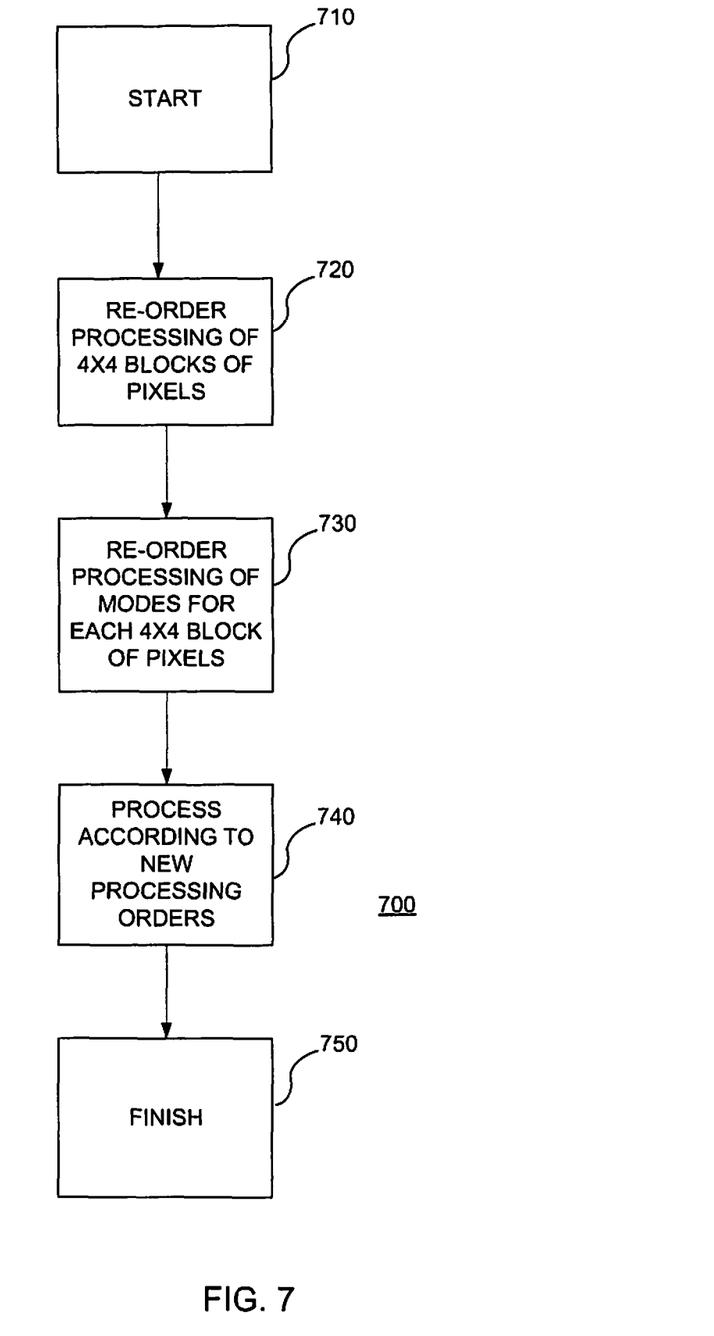
FIG. 7 shows a high level schematic diagram of the method of improving RDO latency according to an embodiment of the present invention.

FIG. 7 shows the high level flow diagram of the proposed method, where the process starts at step 710, then re-orders the processing of 4×4 blocks of pixels at step 720, and goes on to re-order the processing of modes for each 4×4 block of pixels at step 730. The video is then processed according to the reordered processing at step 740 before finishing at 750. The re-ordering steps may be carried out the other way round, i.e. step 730 coming before step 720.

In more detail:

Re-Ordering of the Processing of 4×4 Blocks

Referring back to FIG. 1, the first part of the invention exploits the observation that the upper two 4×4 blocks (e.g. blocks 4 and 5) of an 8×8 block (e.g. block B) and the lower two 4×4 blocks (e.g. 2 and 3) of the previous 8×8 block (e.g. block A) can be processed concurrently while still satisfying the prediction dependencies between the 4×4 blocks.

This fact is also used in the two-pipeline implementation. However, this present invention uses a single pipeline implementation, so the blocks are processed pseudo-concurrently rather than truly concurrently, with a resultant reduction in resource requirement compared to the two-pipeline implementation, but without any reduction in capability of processing all the 4×4 blocks within the macroblock processing period.

In this single pipeline implementation, a block cannot be started at the same time as another, but it can be started before the results are available (i.e. before the mode decision has been made and the recon set produced) for the previously processed block. A non-dependent block can easily be processed in the standard gap between two dependent blocks. Hence the processing of the upper 4×4 blocks (of an 8×8 block) can be interleaved with the lower 4×4 blocks (of the previous 8×8 block).

Figure 6:
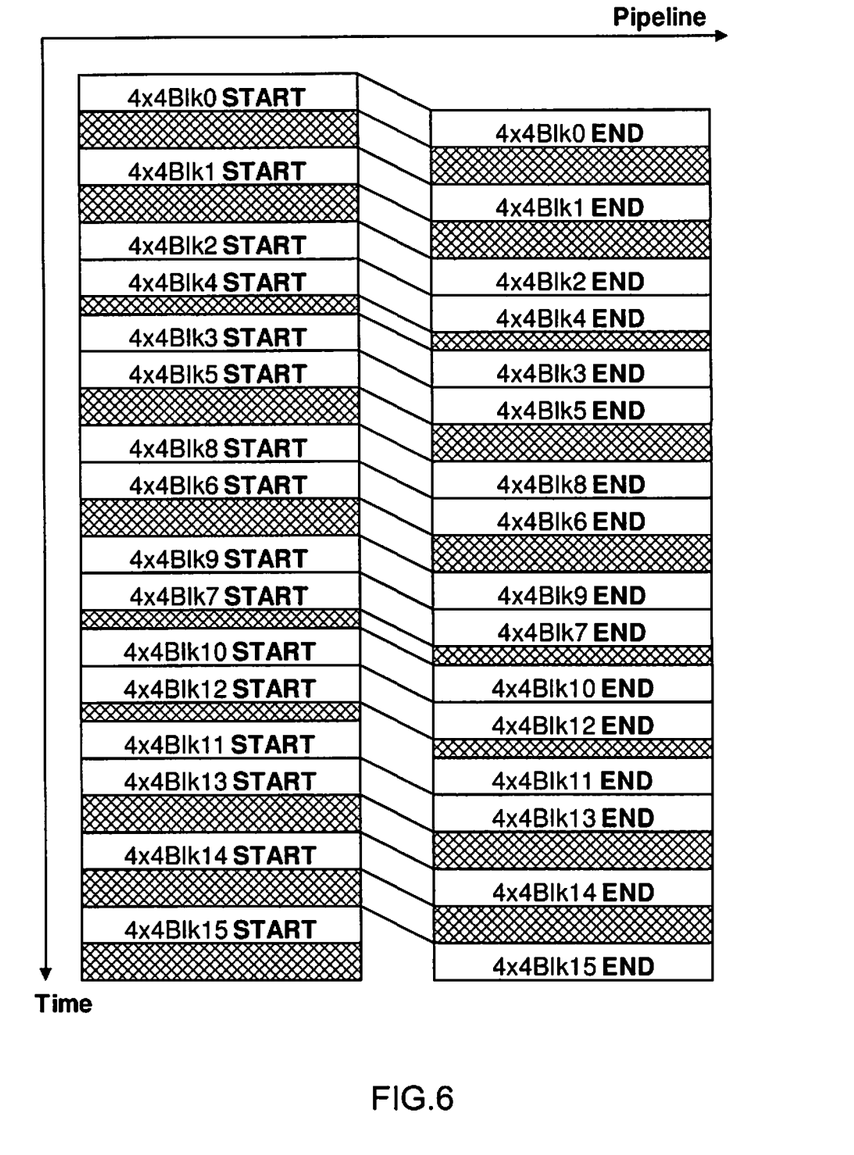
FIG. 6 shows a method of processing 4×4 intra blocks according to an embodiment of the present invention, including pipeline delays.

As shown in FIG. 6, one particular described arrangement is processing the 4×4 blocks in the order 0, 1, 2, 4, 3, 5, 8, 6, 9, 7, 10, 12, 11, 13, 14, 15, which allows six pairs of 4×4 blocks (e.g. 2 and 4, 3 and 5, etc) to be processed contiguously, hence leaving only 10 gaps in the processing rather than 16. The processing of the contiguous pairs may be carried out either way round, i.e. 2 then 4, or 4 then 2. This reordering of the processing of the 4×4 blocks leads to a significant reduction in wasted clock cycles in the pipeline and a reduction in overall macroblock processing time.

Reducing the Gaps by Re-Ordering Prediction Modes

The standard delay between the start of a 4×4 block and one that is dependent upon it is 31 cycles (22+9, from FIG. 4). The actual processing cycles for the invention are shown in the table in FIG. 12. The total is calculated from the cycles for each block and the gaps between them.

The standard delay is maintained between blocks where the dependency is for prediction mode 0 (Vertical), 1 (Horizontal) or 2 (DC). These three modes require the processing of a 4×4 block above and to the left to be completed. Hence the standard delay is maintained between all upper pairs and lower pairs of 4×4 blocks in an 8×8 block, for example 0 and 1, 2 and 3, 4 and 5, 14 and 15.

Only three prediction modes actually have a dependency on the 4×4 block above and to the right. Those modes are: 3 (Diagonal Down Left), 7 (Vertical Left) and 8 (Horizontal Up). Hence, in one optimised solution, the processing order of the modes is changed from the conventional order of 0-8 to 0, 1, 2, 4, 5, 6, 3, 7, 8, such that the first six modes processed are not dependent on the block above and to the right. This allows the delay between a 4×4 block and its dependent 4×4 block above and to the right to be reduced. This re-ordering achieves a three cycles reduction between these pairs of blocks.

The reduction applies from the top right 4×4 block to the bottom left 4×4 block in each 8×8 block, i.e. 1 to 2, 5 to 6, 9 to 10 and 13 to 14. The reduction also applies from the bottom right 4×4 block to the top left 4×4 block in the 8×8 block below, i.e. 3 to 8 and 7 to 12. Furthermore, the reduction applies from block 6 to 9.

Figure 8:
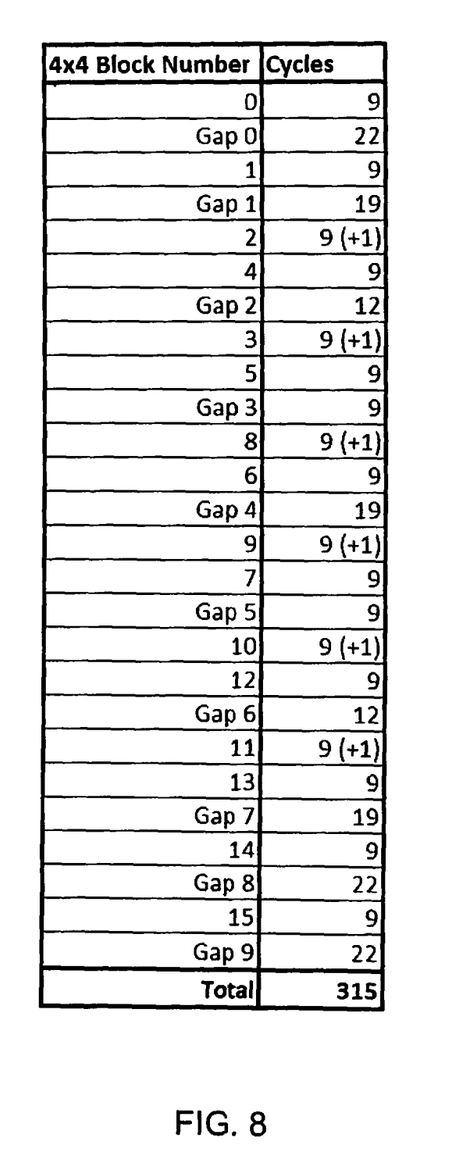
FIG. 8 shows one optimised form of the method of improving RDO latency according to an embodiment of the present invention, including cycles used.

FIG. 8 shows one embodiment of a final re-ordered processing pipeline, including cycles used.

Each 4×4 block requires a cycle per mode processed, totaling 9 cycles for each block. A standard delay of 22 cycles is maintained to maintain certain block dependencies, where required. This happens for gaps 0, 8 and 9 in FIG. 8. Meanwhile, where another block can be processed in the traditional gap, the resultant re-ordered gap is reduced to 12 cycles, because 10 out of the 22 cycles can be used to process another non-dependent 4×4 block, where 9 cycles covers the extra block being processed, and there is a 1 cycle delay between the processing of two contiguous blocks. This is shown as a 9 (+1) cycle cost in FIG. 8, as seen for block numbers 2, 3, 8, 9, 10 and 11.

Where only a single 3 cycle reduction is achieved, the gap is reduced to 19, for example for gaps 1, 4, and 7.

Where the 3 cycle reduction through re-ordering the mode processing is combined with the processing of a non-dependent block, the gap is reduced to only 9 (i.e. 22−(10+3)), which is the case for gaps 3 and 5 of FIG. 8.

Figure 9:
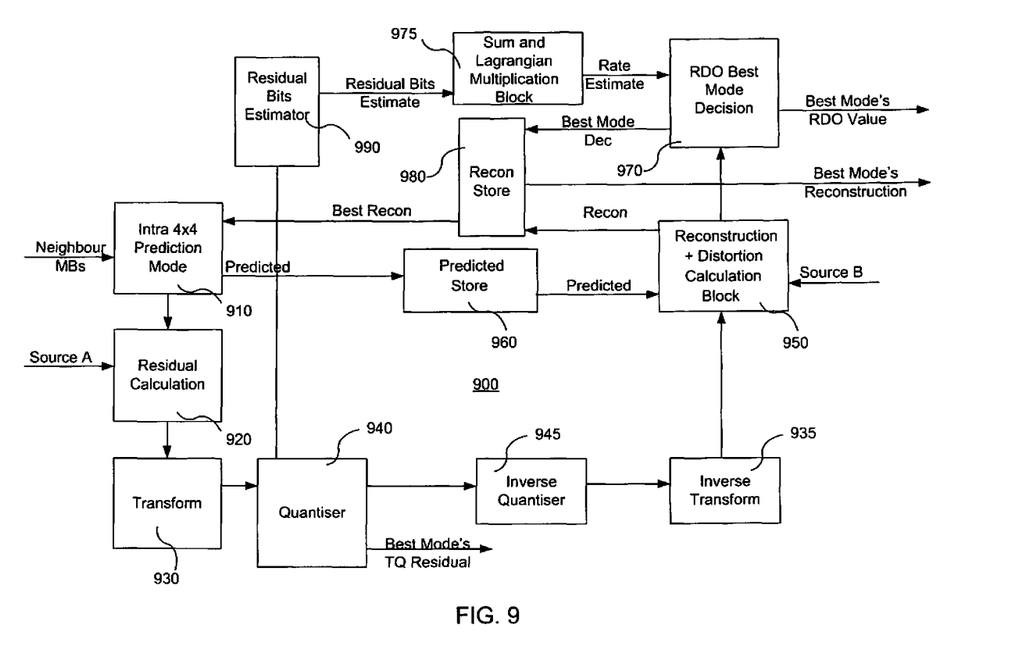
FIG. 9 shows a schematic diagram of a 4×4 Intra block processing pipeline according to an embodiment of the present invention.

FIG. 9 shows how the intra 4×4 RDO engine 900 (a.k.a. Transform Quantise (TQ) loop) operates when an embodiment of the present invention is implemented.

The intra 4×4 prediction mode block 910 uses the neighbouring MB input to produce the predicted data for the prediction mode being processed of the 4×4 block of pixels being processed. This data is stored in the predicted data store unit 960 and passed on to the residual calculation block 920. The residual calculation block 920 calculates the difference between the source input and predicted data for the 4×4 block and the mode being processed. The determined residual (difference) is processed by the transform unit 930 and the forward quantiser 940. The output of the forward quantiser 940 is fed to a residual bits estimator 990, which calculates the approximate number of bits required to encode the data, and separately to the inverse quantiser 945. The forward quantiser's 940 output, when processing the best modes for the chosen MB, is also an output from the whole RDO engine 900.

The inverse quantiser 945 is immediately followed by the inverse transform unit 935, which carries out the inverse transform function. Within the reconstruction and distortion calculation block 950, the output of the inverse transform unit 935 is added to the predicted data retrieved from the predicted data store unit 960 to produce the reconstructed (recon) data. The recon data is stored in the recon store 980, such that it can provide the recon data when processing the best modes for the chosen MB to allow the 4×4 blocks to be contiguous.

The difference between the recon data and the source is the distortion introduced by the quantisation process, which is fed to the RDO best mode decision block 970. The sum and langrangian multiplication block 975 takes the residual bits estimate, adds an overhead bits estimate (for the mb_type and other macroblock level coding syntax elements) before multiplying the result by lambda and passing the result to the RDO best candidate decision block 970. The RDO best candidate decision block 970 then has both the terms of the RDO equation, and can calculate an RDO score for the mode being processed.

Figure 10:
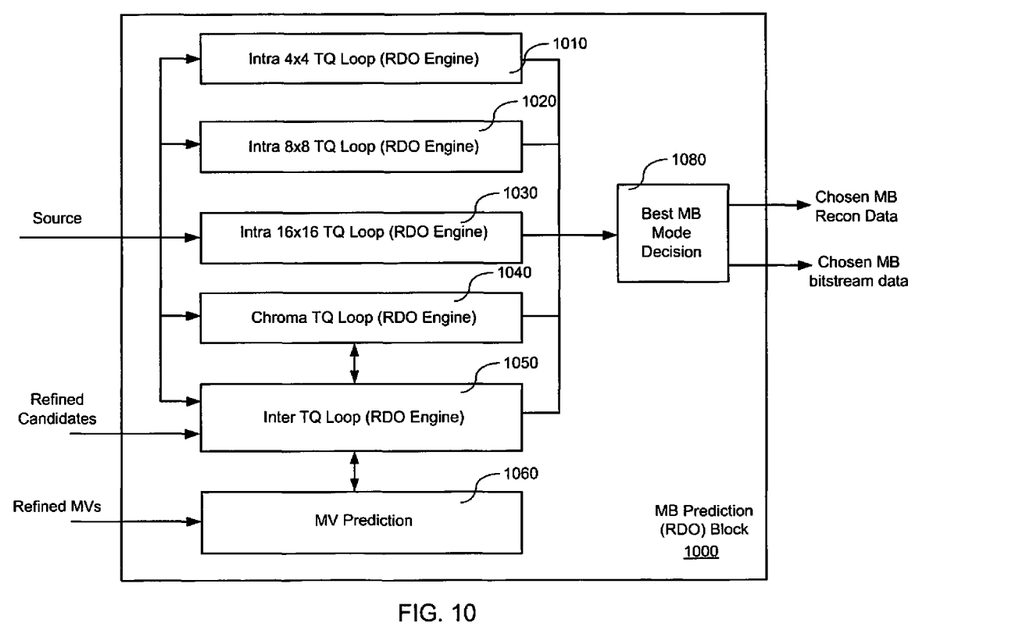
FIG. 10 shows a schematic diagram of a macroblock prediction block according to an embodiment of the present invention.

FIG. 10 shows how five RDO engines (1010-1050) are used at the macroblock prediction level in a Macroblock prediction block 1000. The intra 4×4 TQ loop 1010 finds the best possible intra 4×4 predicted macroblock, and incorporates the method as described above. The intra 8×8 TQ loop 1020 finds the best possible intra 8×8 predicted macroblock. The intra 16×16 TQ loop 1030 finds the best possible intra 16×16 predicted macroblock. The chroma TQ loop 1040 finds the best possible intra chroma prediction mode and also provides an inter chroma RDO score to the inter TQ loop. The inter TQ loop 1050 finds the best possible inter macroblock type from the inter predicted candidates provided by the refinement search.

The Motion Vector (MV) prediction block 1060 calculates the direct mode MV and provides MV prediction data to the inter TQ loop 1050. The best macroblock mode decision block 1080 takes the best RDO scores from the four luma TQ loops, adds the appropriate chroma RDO score and then decides on the best macroblock to encode. The reconstructed data for the chosen macroblock is passed on the deblocking filter and the data to be encoded into the bitstream is passed on to the entropy coder.

Figure 11:
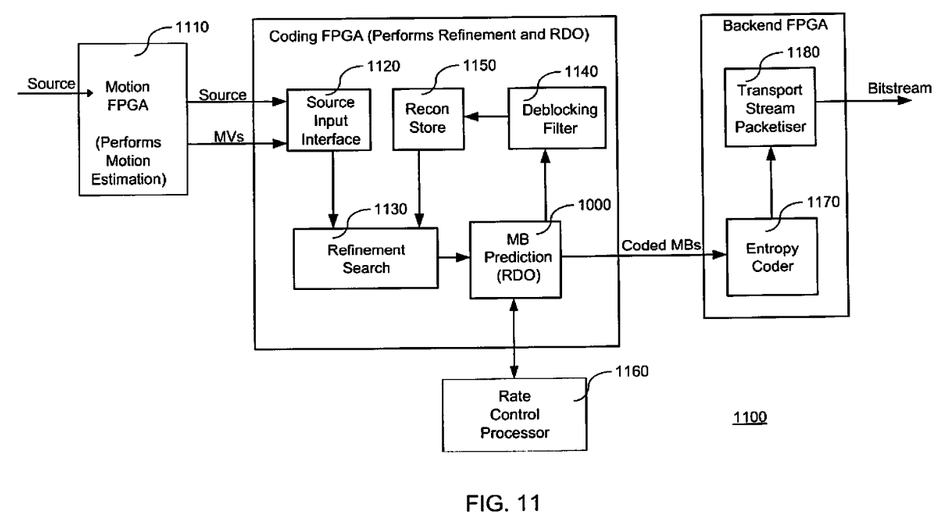
FIG. 11 shows an overview schematic diagram of a video encoder according to an embodiment of the present invention.

FIG. 11 shows the macroblock prediction block 1000 in the context of the whole encoder. The motion Field Programmable Gate Array 1110, or equivalent ASIC or the like, performs motion estimation which provides the inter candidates, which once refined by the refinement search 1130 are passed to the macroblock prediction (RDO) block 1000. The deblocking filter 1140 smooths the chosen macroblock reconstructed data before the recon store 1150 saves it as possible reference for future inter candidates. The entropy coder 1170 processes the chosen macroblock bitstream data to produce the bitstream Network Adaptation Layer (NAL) units, which are packetised into the transport stream by the TS packetiser 1180.

Embodiments of the invention provide a pipelined RDO design, such as that shown in FIG. 9 to process intra 4×4 modes more efficiently and in less overall clock cycles. Thus, the efficiency improvement allows more options (inter candidates or intra modes) to be processed by the hardware resources taken up by an RDO engine. Generally RDO comparison of more options will give higher video encoding performance.

The improvement in processing intra 4×4 modes, allows all modes to be evaluated within a 1080p60 macroblock period.

The above described method may be carried out by any suitably adapted or designed hardware. Portions of the method may also be embodied in a set of instructions, stored on a computer readable medium, which when loaded into a computer, Digital Signal Processor (DSP) or similar, causes the computer to carry out the hereinbefore described method.

Equally, the method may be embodied as a specially programmed, or hardware designed, integrated circuit which operates to carry out the described RDO method when loaded into said integrated circuit. The integrated circuit may be formed as part of a general purpose computing device, such as a PC, and the like, or it may be formed as part of a more specialised device, such as a hardware video encoder, or the like.

One exemplary hardware embodiment is that of a Field Programmable Gate Array (FPGA) programmed to provide the described apparatus and/or to carry out the described RDO method, the FPGA being located on a daughterboard of a rack mounted video encoder held in a video production suite, location video support van/uplink van or the like, for use in, for example, television broadcasting or video production.

Another exemplary hardware embodiment of the present invention is that of hardware video encoder device embodied as one or more Application Specific Integrated Circuits (ASICs).

There is a particularly significant improvement in allowing all Intra 4×4 modes to be evaluated within a 1080p MB period at a practical FPGA clock speed of 200 MHz. Evaluating all Intra 4×4 modes achieves the maximum possible encoding performance for Intra 4×4 options.

It will be apparent to the skilled person that the exact order and content of the steps carried out in the method described herein may be altered according to the requirements of a particular set of execution parameters, such as speed, quality or output bit rate of the video, and the like. Furthermore, it will be apparent that different embodiments of the disclosed apparatus may selectively implement certain features of the present invention in different combinations, according to the requirements of a particular implementation of the invention as a whole. Accordingly, the claim numbering is not to be construed as a strict limitation on the ability to move features between claims, and as such portions of dependent claims maybe utilised freely.

The invention claimed is:

1. A Rate Distortion Optimization (RDO) apparatus of a video encoder comprising:
a source input communication with at least one RDO engine, said source input adapted to provide macroblock source data; and
a best macroblock mode decision unit, wherein the at least one RDO engine comprises a 4×4 intra RDO engine adapted to:
re-order processing of a sequence of 4×4 blocks of pixels received for processing by the RDO apparatus, a received order of the 4×4 blocks of pixels corresponding to a location of the 4×4 blocks of pixels within a macroblock; and
process a re-ordered sequence of 4×4 blocks in the RDO apparatus;
wherein the re-order of the processing of the 4×4 blocks of pixels comprises interleaving processing of two upper 4×4 blocks of pixels of a current 8×8 block with processing of two lower 4×4 blocks of pixels of a previous 8×8 block.

2. The RDO apparatus of a video encoder of claim 1, wherein interleaving the processing of two upper 4×4 blocks of pixels of a current 8×8 block with the processing of two lower 4×4 blocks of pixels of a previous 8×8 block comprises:
processing a one of:
a first 4×4 block of pixels out of the two upper 4×4 blocks of pixels of a current 8×8 block; or
a first 4×4 block of pixels out of the two lower 4×4 blocks of pixels of a previous 8×8 block;
processing a remaining unprocessed one of:
the first 4×4 block of pixels out of the two upper 4×4 blocks of pixels of a current 8×8 block; or
the first 4×4 block of pixels out of the two lower 4×4 blocks of pixels of a previous 8×8 block;
processing a one of:
a second 4×4 block of pixels out of the two upper 4×4 blocks of pixels of a current 8×8 block; or
a second 4×4 block of pixels out of the two lower 4×4 blocks of pixels of a previous 8×8 block;
processing a remaining unprocessed one of:
the second 4×4 block of pixels out of the two upper 4×4 blocks of pixels of a current 8×8 block; or
the second 4×4 block of pixels out of the two lower 4×4 blocks of pixels of a previous 8×8 block.

3. The RDO apparatus of a video encoder of claim 1, wherein the 4×4 blocks of pixels of a macroblock of interest are numbered according to FIG. 2, and the method applies from blocks 3 to 13.

4. The RDO apparatus of a video encoder of claim 1, wherein the 4×4 blocks of pixels of a macroblock of interest are numbered according to FIG. 2, and the processing order is: 0, 1, 2 or 4*, 4 or 2*, 3 or 5*, 5 or 3*, 8 or 6*, 6 or 8*, 9 or 7*, 7 or 9*, 10 or 12*, 12 or 10*, 11 or 13*, 13 or 11*, 14, 15;
wherein * are complimentary pairs of one each of the two alternative numbers in either order.

5. A video encoder comprising:
a source input data store; and
a Rate Distortion Optimization (RDO) apparatus comprising:
a source input communication with at least one RDO engine, said source input adapted to provide macroblock source data, and
a best macroblock mode decision unit, wherein the at least one ROO engine comprises a 4×4 intra ROO engine adapted to;

re-order processing of a sequence of 4×4 blocks of pixels received for processing by the ROO apparatus, a received order of the 4×4 blocks of pixels corresponding to a location of the 4×4 blocks of pixels within a macroblock, and process a re-ordered sequence of 4×4 blocks in the RDO apparatus, wherein the re-order of the processing of the 4×4 blocks of pixels comprises interleaving processing of two upper 4×4 blocks of pixels of a current 8×8 block with processing of two lower 4×4 blocks of pixels of a previous 8×8 block.

* * * * *

UNITED STATES PATENT AND TRADEMARK OFFICE
CERTIFICATE OF CORRECTION

PATENT NO.         : 8,488,673 B2                                           Page 1 of 1
APPLICATION NO.    : 12/555955
DATED              : July 16, 2013
INVENTOR(S)        : Dencher It is certified that error appears in the above-identified patent and that said Letters Patent is hereby corrected as shown below:

On the Title Page, item (56), under "OTHER PUBLICATIONS", in Column 2, Line 1, delete "DistortionOPtimization" and insert -- Distortion Optimization --, therefor.

In the Specifications:

In Column 4, Line 3, delete "Infra" and insert -- Intra --, therefor.

In Column 5, Line 60, delete "Infra" and insert -- Intra --, therefor.

In Column 8, Line 25, delete "Infra" and insert -- Intra --, therefor.

In Column 8, Line 27, delete "Infra" and insert -- Intra --, therefor.

In the Claims:

In Column 12, Line 56, in Claim 4, delete "of the two" and insert -- of two --, therefor.

In Column 12, Line 66, in Claim 5, delete "one ROO engine" and insert -- one RDO engine --, therefor.

In Column 12, Lines 66-67, in Claim 5, delete "intra ROO engine" and insert -- intra RDO engine --, therefor.

In Column 13, Line 2, in Claim 5, delete "ROO" and insert -- RDO --, therefor.

Signed and Sealed this
Sixth Day of May, 2014

Michelle K. Lee
*Deputy Director of the United States Patent and Trademark Office*